United States Patent
Kofferath et al.

(10) Patent No.: US 11,358,543 B2
(45) Date of Patent: Jun. 14, 2022

(54) SHIELDING ELEMENT

(71) Applicant: CARCOUSTICS TECHCONSULT GMBH, Leverkusen (DE)

(72) Inventors: Christoph Kofferath, Erkelenz (DE); Thomas Lammert, Overath (DE); Friederike Horand, Cologne (DE); Paul Schönzart, Leverkusen (DE)

(73) Assignee: CARCOUSTICS TECHCONSULT GMBH, Leverkusen (DE)

(*) Notice: Subject to any disclaimer, the term of this patent is extended or adjusted under 35 U.S.C. 154(b) by 0 days.

(21) Appl. No.: 17/269,915

(22) PCT Filed: Aug. 19, 2019

(86) PCT No.: PCT/EP2019/072100
§ 371 (c)(1),
(2) Date: Feb. 19, 2021

(87) PCT Pub. No.: WO2020/038866
PCT Pub. Date: Feb. 27, 2020

(65) Prior Publication Data
US 2021/0380050 A1    Dec. 9, 2021

(30) Foreign Application Priority Data

Aug. 21, 2018 (DE) .................. 10 2018 120 379.9

(51) Int. Cl.
*B60R 13/08* (2006.01)
*H02K 5/24* (2006.01)

(52) U.S. Cl.
CPC .......... *B60R 13/0884* (2013.01); *H02K 5/24* (2013.01)

(58) Field of Classification Search
CPC .............................. H02K 5/24; B60R 13/0884
USPC ........................................................... 181/210
See application file for complete search history.

(56) References Cited

U.S. PATENT DOCUMENTS

| | | | |
|---|---|---|---|
| 4,854,278 A * | 8/1989 | Honecker | B60K 11/02 123/198 E |
| 5,151,240 A | 9/1992 | Asano et al. | |
| 7,770,692 B2 * | 8/2010 | Hazelton | B60R 13/0838 181/290 |
| 8,091,685 B2 * | 1/2012 | Nakamura | B60R 13/08 181/286 |
| 10,150,429 B2 * | 12/2018 | Takezawa | B60R 13/0884 |
| 10,214,159 B1 * | 2/2019 | An | B60R 13/0838 |
| 10,562,489 B2 * | 2/2020 | Sadakhom | B60R 22/34 |

(Continued)

FOREIGN PATENT DOCUMENTS

| CN | 203822465 U | 9/2014 |
|---|---|---|
| CN | 205674842 U | 11/2016 |

(Continued)

OTHER PUBLICATIONS

International Search Report dated Sep. 25, 2019 re: Application No. PCT/EP2019/072100, pp. 1-2.

*Primary Examiner* — Forrest M Phillips
(74) *Attorney, Agent, or Firm* — Cantor Colburn LLP

(57) ABSTRACT

An acoustically and thermally effective capsule for an electric motor of a motor vehicle, particularly of an electric vehicle, includes several acoustically and thermally effective capsule elements that can be connected to one another, and at least one fastening member for fastening the capsule to a housing of the electric motor.

9 Claims, 1 Drawing Sheet

(56) References Cited

U.S. PATENT DOCUMENTS

| | | | | |
|---|---|---|---|---|
| 10,607,589 B2 * | 3/2020 | Arvidson | ................ | B32B 5/145 |
| 10,855,139 B2 * | 12/2020 | Dubois | .................... | H02K 5/24 |
| 11,131,311 B2 * | 9/2021 | Diehl | ..................... | H02K 11/33 |
| 2013/0273309 A1 * | 10/2013 | Schaefer | ................. | B32B 5/024 |
| | | | | 428/118 |

FOREIGN PATENT DOCUMENTS

| | | | | |
|---|---|---|---|---|
| CN | 206379839 U | 8/2017 | | |
| CN | 206559180 U | 10/2017 | | |
| DE | 19510287 A1 | 9/1996 | | |
| EP | 3138688 A1 | 3/2017 | | |
| GB | 2539969 A * | 1/2017 | ........... | F02M 59/027 |
| JP | S5782398 U | 5/1982 | | |
| JP | S61277341 A | 12/1986 | | |
| WO | 9933156 A1 | 7/1999 | | |

* cited by examiner

SHIELDING ELEMENT

TECHNICAL FIELD

The present application relates to an acoustically and thermally effective capsule for an electric motor of a motor vehicle, particularly of an electric vehicle. The noise emissions of electric motors known from the prior art can be reduced considerably with the acoustically and thermally effective capsule according to the disclosure, with condensate formation being effectively reduced at the same time, and an accumulation of condensate forming on the electric motor thus being prevented.

In the sense of the present application, electric vehicles are understood to be both motor vehicles driven purely electrically and so-called hybrid variants, i.e. motor vehicles containing an internal combustion engine as well as at least one electric drive motor.

BACKGROUND

Though the electric motors known from the prior art are already many times quieter compared to internal combustion engines, there is still a desire for a further reduction of the noise emissions, particularly in the interior of the vehicle. For example, WO 99/33156 proposes to manufacture the individual components of an electric motor, particularly the stator and the rotor, from composite materials. To this end, the individual electrical sheets are replaced with composite materials comprising two thinner electrical sheets connected to each other by means of a polymer layer. Viscoelastic plastics, such as elastomers, are used as the polymer layer.

Such electric motors exhibit the desired reduction of the noise emissions. In practical application, however, it becomes apparent that such systems react very sensitively to contact with oils, which may result in the dissolution of the composite systems.

A device made from compressed aluminum fibers for encasing an engine and for damping its vibrations and noise is known from JP S61 277341 A. Another metallic body, which has cooling fins and serves for dissipating heat, is to be arranged around the periphery of the engine.

An encapsulating component for an installed device, in particular for a heat pump, is known from EP 3 138 688 A1.

A sound-proof body, which is to be disposed around an engine and serve for noise attenuation, is known from JP S57 82398 U. The material of the sound-proof body may be polyurethane foam.

A composite material with a polymer surface layer, which is connected to a substrate via at least one adhesive layer, is known from US 2013/273309 A1. The substrate comprises at least partially an open-pore polyurethane foam. The material is intended for the trim of the interior of a vehicle.

SUMMARY

Therefore, the disclosure is based on the providing a means improved over the prior art, which not only permits a reduction of noise emissions of electric motors known from the prior art, but which is capable of reducing the formation of condensate at the same time.

This is achieved by providing a device having the features of the independent claim.

Advantageous embodiments and variants of the disclosure become apparent from the dependent claims and the following description. The features cited individually in the claims can thus be combined in any technologically meaningful manner both with each other and with the features presented in more detail in the following description, and can represent other advantageous embodiment variants of the disclosure.

The acoustically and thermally effective capsule with an interior for accommodating an electric motor of the disclosure has several acoustically and thermally effective capsule elements that can be connected to one another, and at least one fastening member for fastening the capsule to a housing of the electric motor. The capsule elements comprise one or several layers comprising a flexible, open-pore polyurethane foam to permit a diffusion of water vapor through the capsule elements. Furthermore, the capsule elements have stiffening members disposed on the inside in order to reduce deformations due to its own weight and to drain condensate.

Acoustic effectivity is understood to be a reduction of noise emissions or acoustic damping. Thermal effectivity is to be understood to mean that a sufficient exchange of air between the interior space between the capsule and the electric motor and the environment outside the capsule, or sufficient convection, is ensured, particularly in order to avoid condensation of moisture in the aforementioned interior space or on the electric motor.

The noise generated by the electric motor is absorbed to a great extent, and an operation of the electric motor almost free from noise emissions is ensured, by the capsule surrounding the electric motor. This has an advantageous effect particularly in the interior space of the vehicle. Due to the thermal effectivity, the electric motor is moreover thermally insulated from the environment by the capsule surrounding it.

Also, because the individual capsule elements can be connected to one another, a simple, cost-effective and retrofittable option for reducing the noise emissions, particularly in the interior space of the vehicle, is provided.

Various fastening methods may be used in order to connect the capsule elements to one another, be it based on mechanical fastening means, fastening means integrated into the capsule elements or by adhesive agents. In particular, the capsule elements may be connected to one another by plugging and/or gluing them together. A plug-type connection permits a maintenance-friendly assembly and dismantling of the capsule according to the disclosure without additional tools being required. In addition or as an alternative, the capsule elements may be connected to one another by hook-and-loop straps, tie members, straps, magnetic devices or tabs, i.e. particularly by means of mechanical fastening devices. It is noted again that the above-mentioned means may be directly integrated into the capsule elements (e.g. by foam-covering or attachment by foaming), or may be used in the form of external fastening means. It may be noted in this context that the capsule elements can be connected to one another in such a way that the capsule elements overlap at least partially or are spaced apart from one another at least partially in the connection regions. The connection of the capsule elements may be adapted to the acoustic requirements or the requirements for ensuring a low condensate formation or an optimized drainage of condensate.

According to the disclosure, the capsule elements comprise one or several layers comprising a flexible, open-pore polyurethane foam. The open-pore structure ensures that a diffusion of water vapor through the capsule elements or the capsule can take place. For example, the moisture present in the space encased by the capsule can escape when the temperature rises due to the operation of the electric motor, so that the ambient air is dried. In the event of a drop in temperature during the further operation, almost no condensate can precipitate. Inadvertent damage to the electric motor in the sense of corrosion or moisture-based weathering is avoided by such a design. At the same time, sufficient acoustic effectivity is provided by the structure of the capsule elements according to the disclosure, which comprises one or several layers of a flexible, open-pore polyurethane foam. The density of the polyurethane foam is typically in the range of 60 to 130 kg/m³.

Higher-density polyurethane foams may also be used, depending on the case of application. If the capsule element is supposed to primarily have sound-insulating properties, a polyurethane foam with a density of at least 250 kg m³ has proved particularly advantageous. But even in such an embodiment a sufficient drainage of formed condensate or sufficient drainage of such a condensate may be ensured, particularly due to the embodiments mentioned within the context of the description of the disclosure herein.

The capsule of the disclosure preferably comprising 2 to 6, more preferably of 4 to 6, individual interconnectable acoustically and thermally effective capsule elements.

Furthermore, the capsule according to the disclosure is disposed around the electric motor with a defined distance so that sufficient convection of the air is ensured. In order to avoid a capillary effect which may possibly arise, such that condensed water is absorbed by the foamed body, a distance of at least 1500 µm has proved particularly advantageous. A defined distance of the capsule can also result in a reduction of the formation of condensate as such, because the moisture forming can undergo a drying process based on the air convection directly after the formation of condensate, due to the air convection being ensured by a certain distance of the capsule from the electric motor. Moreover, the distance between the capsule and the electric motor can be adapted, with respect to an acoustical frequency optimization, to the specific requirements at hand. Depending on the size and power of the motor, different distances may be required in order to obtain the same acoustical performance. Thus, the distance may be adapted to the frequency spectrum of the motor.

Particularly preferably, the distance is 3 to 12 mm, more preferably 6 to 9 mm, and most preferably 7 to 8 mm. Smaller distances than the specified 3 mm may also, in principle, afford certain acoustic or thermal advantages.

Preferably, the one or several layers have a layer thickness in the range of 5 to 30 mm.

According to the disclosure, the capsule elements have stiffening members in order to reduce deformations due to its own weight.

The stiffening members may be formed in the form of ribs or channels disposed on the inside and/or outside, from inserts disposed within the capsule elements, and/or from structures with a higher compression. Stiffening members disposed on the inside are in this case provided for condensate drainage, whereby a targeted outflow of condensate that forms is ensured.

Preferably, the inserts comprise a flexurally elastic heavy layer, the heavy layer particularly preferably being selected from ethylene-vinyl acetate (EVA), ethylene propylene rubber (EPM), ethylene propylene diene monomer rubber (EPDM) and/or polyvinyl chloride (PVC) and/or mixtures thereof.

As a matter of principle, it is noted that reinforcing members (be it in the form of ribs, channels, inserts or other structures) may be formed from various materials. The reinforcing members may be integrated into the capsule material (e.g. the polyurethane foam) or attached by molding (e.g. by foam-covering or attachment by foaming), or attached to the capsule material (e.g. glued thereto). They may also be injection-molded polymers or injection-molded heavy layers (injection-molded inserts). Stiffening members with different stiffening directions tailored to the respective application can be produced with injection-molding. Injection-molded polyamide may be mentioned as an exemplary material.

In accordance with a particularly advantageous embodiment of the disclosure, the stiffening members may be formed in the form of an exoskeleton, e.g. in the form of an injection-molded exoskeleton, which is either integrated into the capsule elements or surrounds the latter from the outside or the inside in the sense of a frame structure. Such an exoskeleton may contribute to the overall stiffness of the capsule composed of the capsule elements, but at the same time also permit a certain elasticity. Also, parts of the exoskeleton may serve as anchoring points for fastening the capsule to the electric motor. The shape of the exoskeleton may be adapted to the acoustic and thermal requirements of the capsule. Such an exoskeleton may be fabricated in a single or several parts by injection-molding and, in a separate step, the material of the capsule elements may foam-cover it or be attached thereto by foaming. In the process, positive and/or substance-to-substance connections between the exoskeleton and the capsule elements may be provided.

A preferred layer thickness of the heavy layer is 1 to 5 mm.

Structures with a higher compression are characterized in that they locally have a lesser thickness than other locations of the capsule element surrounding them. Preferably, the structures may be formed by individual or several line segments which are disposed parallel to each other and stiffen the capsule element.

In a particularly preferred embodiment variant, at least one of the capsule elements has a semipermeable membrane, which improves the moisture exchange between the ambient air surrounded by the capsule and the air of the environment. Microperforated films or inmold coatings are used as materials for producing the membrane. Materials from the textile industry, e.g. Gore-Tex™, are also suitable for this purpose. The corrosion or weathering of the electric motor is reduced due to an effective condensate drainage, also by implementing a semipermeable membrane.

In this case, the semipermeable membrane is configured in such a way that the moisture diffuses out of the space encased by the capsule, but that the moisture is incapable of diffusing into the space encased by the capsule from the air of the environment.

For enhancing the sound insulation, preferably at least one of the capsule elements, more preferably 2 to 4 of the capsule elements, have elevated structures, which preferably have a pyramid-shaped configuration, disposed in a pattern-like manner on the inner surface.

According to a particularly preferred embodiment, the regions of the elevated structures facing towards the electric motor, e.g. the peaks of the pyramid-shaped bodies, are flattened, so that they form contact surfaces. Also preferably, the contact surfaces may be provided with a water-repellent agent including, for example, of a hydrophobic plastic. Thus, elevated structures configured in such a manner—in addition to an improved sound insulation—have the function of a spacer and of a fastening member at the same time.

In order to better fix capsule elements configured in this manner to the electric motor, the contact surfaces may preferably be provided with an adhesive.

In another preferred embodiment, the fastening members are formed by pin-shaped elements. It was found to be particularly advantageous if pin-shaped elements made of a foamed plastic, e.g. PUR, are used because fastening members configured in this manner are vibration-decoupling.

Other elastomeric plastics known from the prior art may also be used as a suitable material for the fastening members. Preferably, they are selected from the group of viscoelastic foamed materials. For example, a commercially available elastomeric plastic is distributed under the brand name Cellasto® by the company BASF.

According to another advantageous embodiment of the capsule element according to the disclosure, at least one of the capsule elements, preferably the capsule element forming the bottom of the capsule, has an opening. For example, the opening may have a funnel-shaped configuration so that it forms an outlet and thus, larger accumulations of water concentrating in the region of the bottom of the capsule according to the disclosure can drain away through the opening. This also contributes to an avoidance of corrosion of the encased electric motor.

In another advantageous embodiment, at least one of the capsule elements, preferably the capsule element forming the wall of the capsule, may have one or preferably several slot-shaped openings that ensure a rear ventilation of the capsule according to the disclosure.

Moreover, the capsule according to the disclosure, or at least one of the capsule elements, has a cut-out for a drive shaft and/or a wire harness.

According to another aspect, the present disclosure relates to the use of the capsule according to the disclosure for the acoustic and thermal insulation of an electric motor for a motor vehicle, in particular an electric vehicle.

The present disclosure is explained in more detail below with reference to a schematic illustration.

DETAILED DESCRIPTION OF THE DRAWINGS

Figure 1:
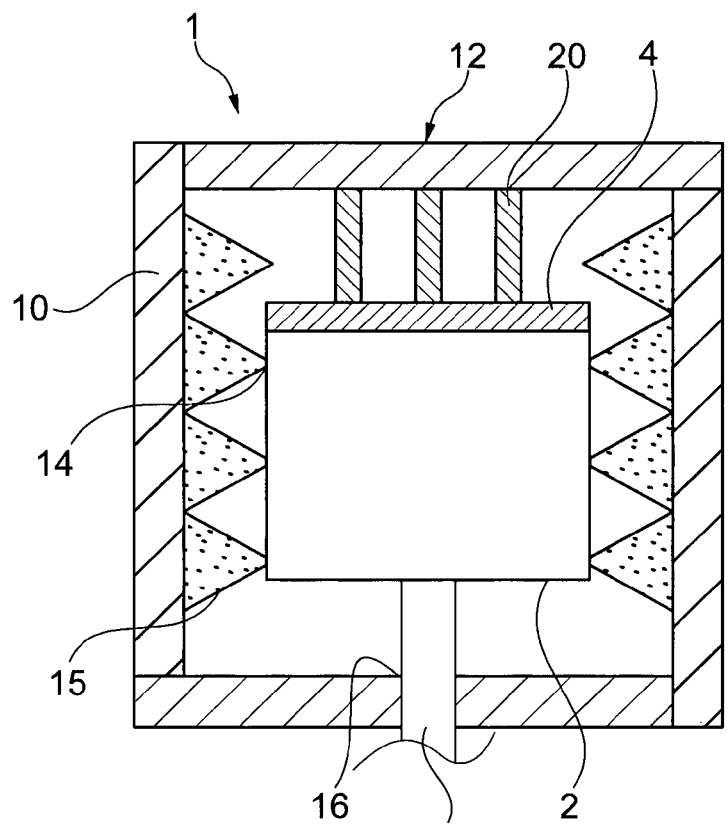
FIG. 1 shows a schematic sectional view of an embodiment of the acoustically effective capsule according to the disclosure.

FIG. 1 shows a greatly simplified cross-sectional view of an embodiment of the acoustically effective capsule 1 according to the disclosure, which is disposed around an electric motor 2 of an electric vehicle (not shown). In addition to other components not shown in detail here, the electric motor 2 has a drive shaft 3 and a base plate 4.

In the present embodiment, the capsule 1 has a cuboid shape and comprises 6 individual acoustically effective capsule elements 10 connected to one another. For example, the capsule elements 10 connected to one another by pins and pin accommodating portions not shown. In order to establish a connection between the individual capsule elements 10, they are plugged into one another and positioned around the electric motor 2.

The capsule 1 further comprises fastening members 20 also configured in the form of pins. They are integrally connected to the upper capsule element 10 forming the lid and extend from an inner surface 11 of the capsule element 1 to the base plate 4 of the electric motor 2. In this case, they form a distance between the two components of about 6 mm. In order to obtain a better fixing effect, the fastening members 20 may be glued to the base plate 4.

In the present embodiment, the lateral capsule elements 10 exhibit pyramid-shaped elevated structures 15 that have an additional sound-insulation effect. As shown in FIG. 1, the elevated structures 15 shown herein also form fastening members 20 laterally fixing the entire capsule 1 to the electric motor 2. For this purpose, the fastening members 15 have at their tips contact surfaces 14 resting against the electric motor 2.

A cut-out 16 grasping around the drive shaft 3 of the electric motor 2 is provided on the lower capsule element 10, which is depicted in FIG. 1.

Figure 2:
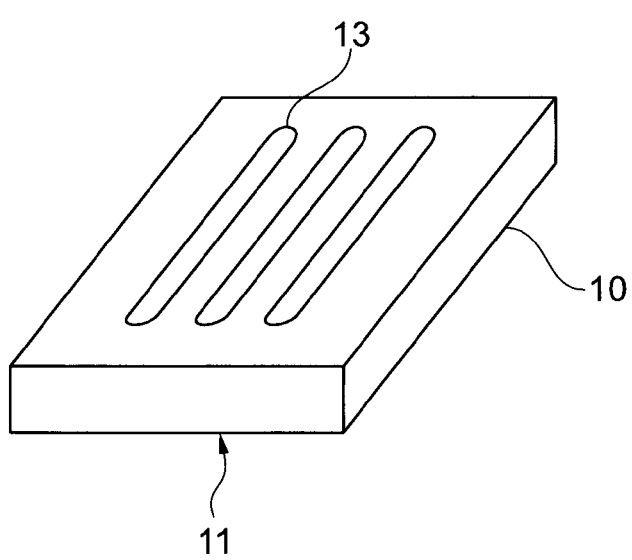
FIG. 2 shows a schematic perspective view of an embodiment of a capsule element.

FIG. 2 shows a greatly simplified schematic perspective view of an embodiment of a capsule element 10 with stiffening members 13. In the present embodiment, the stiffening members 13 are configured in the form of channels disposed parallel to one another, and are disposed on an outer surface 12 of the capsule element 10.

The invention claimed is:

1. An acoustically and thermally effective capsule with an interior space for accommodating an electric motor of a motor vehicle, wherein the capsule enables a reduction of noise emissions or acoustic damping and ensures an exchange of air between the interior space between the capsule and the electric motor and the environment outside the capsule, the capsule comprising:
   several acoustically and thermally effective capsule elements that can be connected to one another, and
   at least one fastening member for fastening the capsule to a housing of the electric motor,
   wherein the capsule elements comprise one or several layers comprising a flexible, open-pore polyurethane foam to permit a diffusion of water vapor through the capsule elements,
   wherein the capsule elements have stiffening members disposed on the inside in order to reduce deformations due to its own weight and to drain condensate.

2. The capsule according to claim 1, wherein the one or several layers have a layer thickness in the range of 5 to 30 mm.

3. The capsule according to claim 1, wherein the stiffening members are configured in the form of an exoskeleton.

4. The capsule according to claim 1, wherein at least one of the capsule elements has a semipermeable membrane.

5. The capsule according to claim 1, wherein at least one of the capsule elements has elevated structures disposed in a pattern on an inner surface.

6. The capsule according to claim 1, wherein at least one of the capsule elements has a cut-out.

7. The capsule according to claim 1, wherein at least one of the capsule elements has a flexurally elastic heavy layer.

8. The capsule according to claim 1, wherein the fastening member is vibration-decoupling.

9. Use of a capsule according to claim 1 for the acoustic and thermal insulation of an electric motor for a motor vehicle.

* * * * *